United States Patent [19]

Myers

[11] Patent Number: 5,226,105
[45] Date of Patent: Jul. 6, 1993

[54] FIBER OPTIC BACKLIGHTING PANEL AND DOT PROCESS FOR MAKING SAME

[75] Inventor: J. Michael Myers, Newport Beach, Calif.

[73] Assignee: Poly-Optical Products, Inc., Santa Ana, Calif.

[21] Appl. No.: 722,757

[22] Filed: Jun. 27, 1991

[51] Int. Cl.⁵ .......................... G02B 6/00; F21V 5/00; H04N 9/31
[52] U.S. Cl. .................................... 385/147; 385/901; 385/120; 362/26; 362/31; 362/330; 358/901
[58] Field of Search ............... 350/96.10, 96.15, 96.24; 362/26, 27, 31, 32, 330, 806; 358/901; 385/115, 120, 147, 901

[56] References Cited

U.S. PATENT DOCUMENTS

| | | | |
|---|---|---|---|
| 2,909,857 | 10/1959 | Wilson | 40/77 |
| 3,183,815 | 5/1965 | Kapany et al. | 385/901 X |
| 3,592,199 | 7/1971 | Ostensen | 128/6 |
| 3,692,383 | 9/1972 | Herod et al. | 385/901 |
| 3,829,675 | 8/1974 | Mariani | 240/1 LP |
| 3,886,544 | 5/1975 | Narodny | 340/365 |
| 4,052,120 | 10/1977 | Sick et al. | 350/6 |
| 4,124,879 | 11/1978 | Schoemer | 362/26 |
| 4,128,332 | 12/1978 | Rowe | 355/67 |
| 4,139,261 | 2/1979 | Hilsum | 385/120 |
| 4,141,058 | 2/1979 | Mizohata et al. | 362/32 |
| 4,141,161 | 2/1979 | Hiscock et al. | 40/547 |
| 4,761,047 | 8/1988 | Mori | 385/901 X |
| 4,845,596 | 7/1989 | Mouissie | 362/32 |
| 4,885,663 | 12/1989 | Parker | 362/32 |
| 4,935,850 | 6/1990 | Smith, Jr. | 362/27 |
| 5,018,007 | 5/1991 | Lang et al. | 358/901 X |
| 5,021,928 | 6/1991 | Daniel | 362/32 |

FOREIGN PATENT DOCUMENTS

56-32104 4/1981 Japan.

*Primary Examiner*—Akm E. Ullah
*Attorney, Agent, or Firm*—Robbins, Dalgarn, Berliner & Carson

[57] ABSTRACT

An improved fiber optic backlighting panel provides increased background illumination relative to the amount of light transmitted therethrough, in devices such as rubber keypads, membrane switches, liquid crystal displays, rigid panels or the like. The fiber optic panel comprises a light source and a layer of optical fibers arranged adjacent each other which transmit the light beamed therein to different locations throughout the device, to provide increased and uniform intensity of light at specific locations or uniformly distributed light throughout the device. The optical fibers are selectively terminated at the different locations by forming holes through the layer of optical fibers with a laser, according to a predetermined geometric pattern of dot locations stored in a computer memory. In one specific embodiment for application in liquid crystal displays, a layer of foam is used to diffuse and scatter light to provide uniform illumination.

37 Claims, 5 Drawing Sheets

FIBER OPTIC BACKLIGHTING PANEL AND DOT PROCESS FOR MAKING SAME

FIELD OF THE INVENTION

The present invention relates generally to the field of providing backlighting in devices such as rubber keypads, membrane switches, liquid crystal displays, rigid panels or the like. More specifically, the present invention relates to an improved fiber optic backlighting panel for providing increased and uniform background illumination and a dot process for making the same, by forming holes and selectively terminating the optical fibers with a laser according to a geometric pattern of dot locations stored in a computer memory.

BACKGROUND OF THE INVENTION

Background illumination, otherwise referred to as backlighting, is commonly used in information display units, rubber keypads, membrane switches, liquid crystal displays, rigid panels and the like, to make them more discernible and to enhance their visibility. Some existing techniques utilize fiber optics for this purpose.

Typically, such prior backlighting devices utilize a plurality of optical conductors, each having a core surrounded by cladding, which are placed in intimate proximity above an optically reflecting surface. Light is beamed into the optical conductors at one end using a simple light source, such as a lamp. The light beamed in is propagated in the core of the optical conductor by means of partial internal refraction.

In accordance with one prior technique, at a desired location on a portion of the optical conductors positioned behind the panel to be illuminated, suitable abrasions are formed in the surface, typically by using a hot stamping machine. The stamping machine forms the abrasions by pressing against the cladding of the optical conductors at the desired locations, in a random manner. As the light passes down the optical conductors, a portion of the light exits through each of abrasions in the surface and illuminates the locations directly above that region. Typically, the remaining light continues its travel along the optical conductors and terminates at a location remote from the abrasions, thus creating inefficient illumination in the abraded area.

U.S. Pat. No. 4,845,596 to Moussie discloses one such technique whereby the outer cladding of the optical conductor is removed locally and a portion of the light beamed through the optical conductors escapes therefrom at those points. This emerging light reflects off the reflective backing and illuminates the surface above.

In such prior devices, the light which exits through the abrasions in the surface provides background illumination of relatively low efficiency relative to the amount of light beamed in. Also, the intensity of light along the fiber optic cable gradually diminishes as light is refracted through the abrasions along the fiber optic cable. Moreover, some light continues to the end. Thus, although such prior devices are known to serve their purpose, they have not proven to be satisfactory.

In accordance with yet another technique, optical conductors are held together by a thread which is tightly woven around the optical conductors, thereby creating corrugations, the angled sides of which exceed the acceptance angle or numerical aperture of the cladding and allow some of the light beamed through to escape. The amount of light which escapes can be limited by controlling the tightness of the weave. In applications not requiring diffusion, in addition to providing relatively low intensity of light, such optical conductors are difficult to use behind key pads due to their thickness.

Most of the prior techniques involve manually placing staggered layers of optical conductors which has proved to be laborious, inefficient and economically unfeasible.

A need thus exists for an improved fiber optic backlighting panel and technique for making fiber optic panels for providing increased intensity of light at specific locations and uniformly distributed illumination throughout the device relative to the amount of light beamed in.

SUMMARY OF THE INVENTION

The present invention is directed to an improved fiber optic backlighting panel for providing increased intensity of background illumination at specific locations and uniformly distributed illumination in devices such as rubber keypads, membrane switches, liquid crystal displays, rigid panels or the like, and a novel technique for making the same.

In the preferred embodiment of the invention, the fiber optic panel comprises a light source, and a layer of optical fibers arranged adjacent each other which transmit the light from the source to a plurality of different locations throughout the device, to provide uniform intensity of light at specific locations or to uniformly distribute light throughout the device.

Each of the optical fibers is selectively terminated at a different location by forming only one hole substantially through the optical fibers with a laser beam from a laser engraver according to a predetermined geometric pattern of dot locations stored in a computer memory. The laser beam is directed or positioned by a CAD (computer aided design) program. The CAD program maps the predetermined geometric pattern of dot locations at which the holes are desired. The light beamed into the layer of optical fibers is selectively terminated at each of the dot locations. To provide uniform illumination throughout a device, the predetermined geometric dot pattern is configured such that the dot locations at which the laser forms the holes are evenly spaced throughout the device.

In still another aspect of the invention, for specific application in liquid crystal displays, the light is transmitted through a layer of foam to provide uniform illumination by diffusing the light.

These as well as other steps of the preferred technique will become apparent from the detailed description which follows, considered together with the appended drawings.

BRIEF DESCRIPTION OF THE DRAWINGS

A preferred embodiment of the present invention is shown in the following drawings, in which like reference numerals indicate like parts and in which.

DETAILED DESCRIPTION OF THE PREFERRED EMBODIMENT

Figure 1:
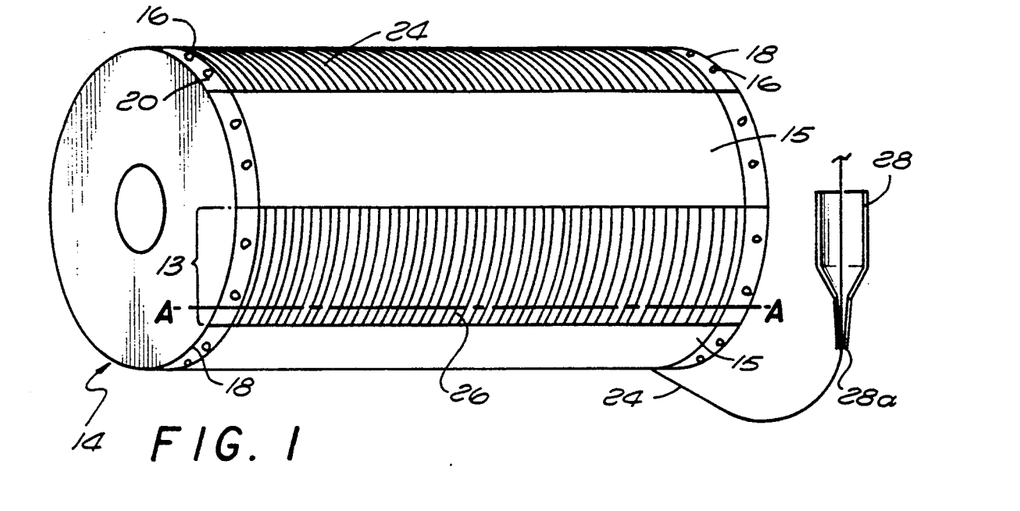
FIG. 1 is a perspective view of a winding drum, showing the manner in which a single optical fiber is wrapped around the winding drum in consecutive turns to form a layer of optical fibers arranged proximate each other and strips of reflective material are positioned on the winding drum by upright pegs.
Figure 2:
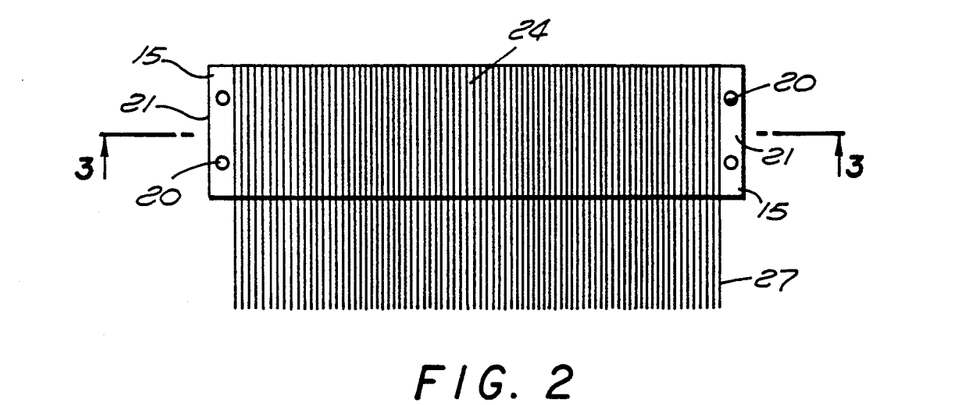
FIG. 2 is a plan view of a backlighting panel, showing the manner in which the layer of optical fibers around the winding drum is severed.
Figure 7:
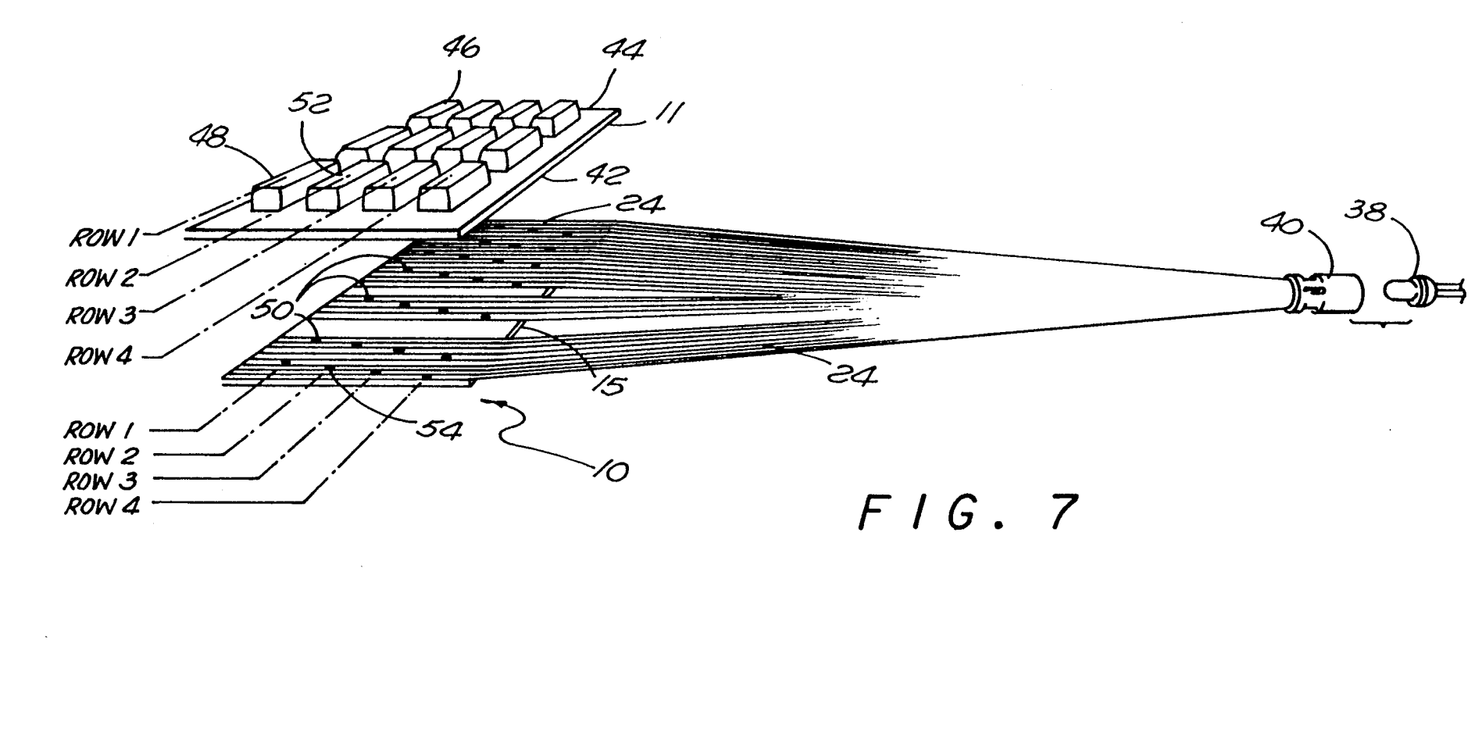
FIG. 7 is an exploded perspective view of the fiber optic/backlighting panel of the present invention for application in a keyboard.
Figures 8, 9, 10:
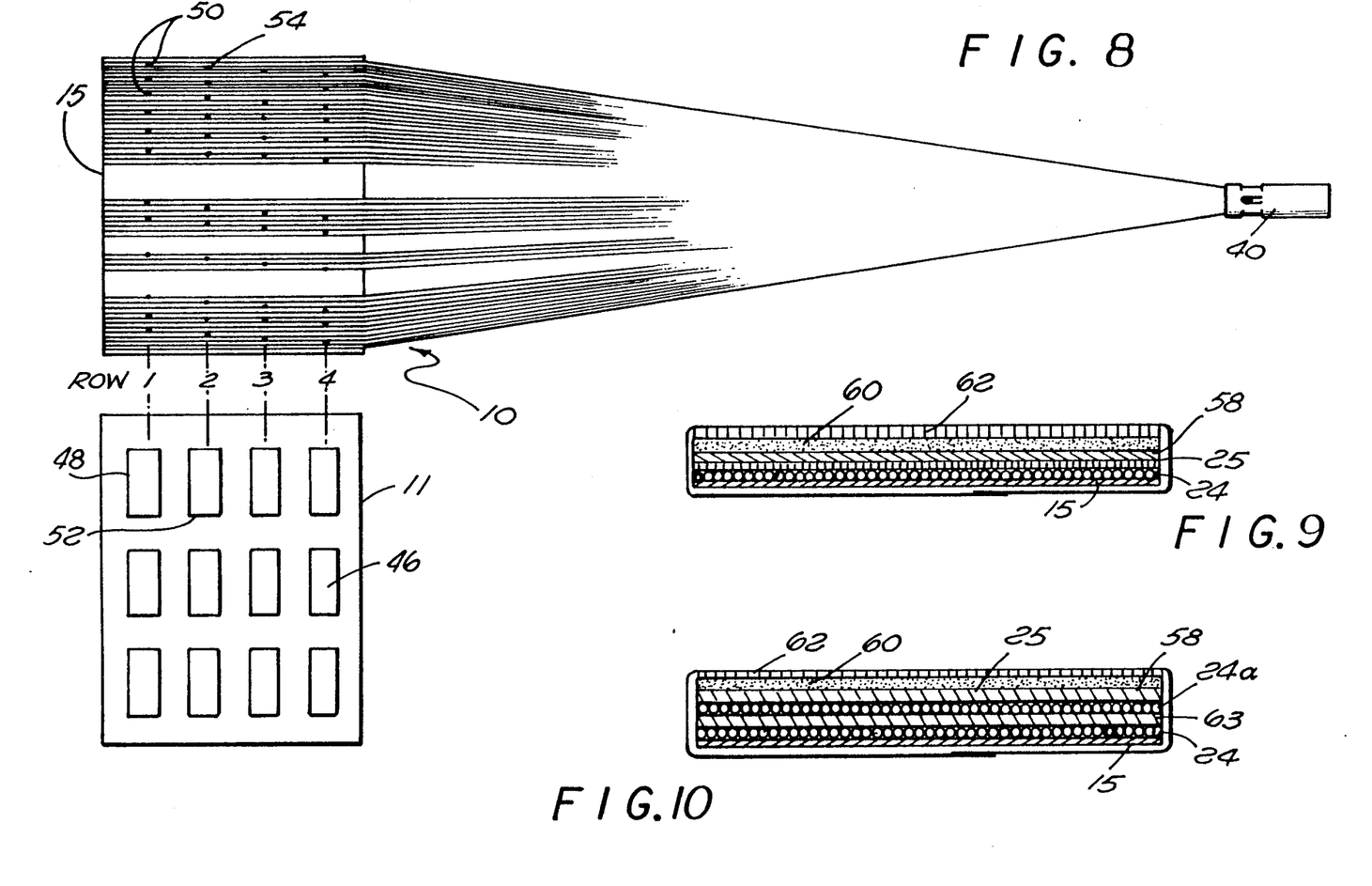
FIG. 8 is an exploded plan view of the fiber optic backlighting panel of the present invention shown in FIG. 7.
FIG. 9 is a schematic representation of the various layers in the backlighting panel including a layer of foam for specific application in a LCD.
FIG. 10 is a schematic representation of the layers in the backlighting panel for specific application in a LCD showing two layers of optical fibers.

FIGS. 1 and 2 show generally the technique for making an improved fiber optic backlighting panel 10 (shown in FIG. 4) in, accordance with the present invention. The improved fiber optic backlighting panel 10 constructed in accordance with the novel technique provides uniform and increased background illumination in devices such as rubber keypads, membrane switches, liquid crystal displays, rigid panels or the like. For illustrative purposes the fiber optic backlighting panel 10, as shown in FIGS. 7 and 8, is used for providing backlighting in a keyboard 11, which is purely exemplary of the diverse applications for which the improved backlighting panel 10 can be used. The backlighting panel 10, when manufactured in accordance with the technique of the present invention, advantageously provides increased brightness and intensity at specific locations in the device and an even distribution of background illumination throughout the device in order to enhance perceptibility. In contrast to prior techniques, the technique of the present invention provides efficient background illumination relative to the amount of light beamed in.

Figure 3:
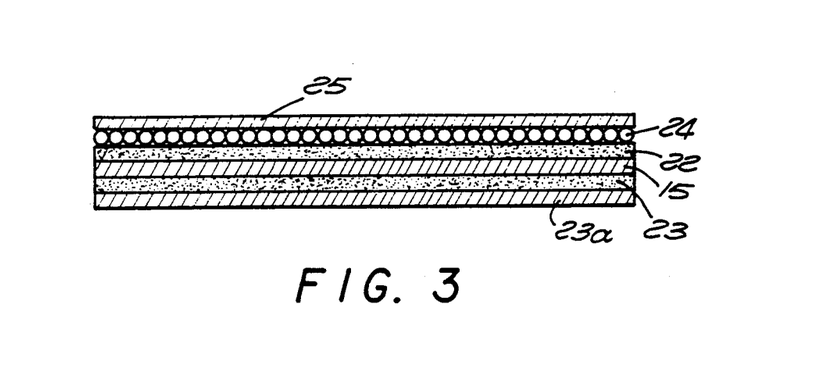
FIG. 3 is a cross sectional view taken along line 3—3 showing the various layers comprising the backlighting panel (the layers shown in FIG. 3 have equal dimensions for purposes of illustration only and do not represent the actual dimensions)

Referring to FIGS. 1, 2 and 3, a single optical fiber 24 from a spool (not shown) is wrapped around a winding drum 14 or the like, which is cylindrical in shape, in consecutive turns to form a layer of optical fibers 24, arranged in intimate proximity or adjacent each other. The optical fiber 24 may be of any commercially available type. For example, the optical fiber 24 has a diameter of preferably 10 mils (thousands of an inch). To prevent the consecutive turns of the optical fiber 24 from overlapping, the optical fiber 24 is guided from the spool to the winding drum 14 by a positioning eyelet 28. The positioning eyelet 28 is preferably a needle-like device, having a central orifice 28a for receiving the optical fiber 24. In a preferred embodiment, the central orifice has a diameter greater than the diameter of the optical fiber, preferably 11 mils. The position of the eyelet 28 is controlled by a linear motor (not shown) which in turn is controlled by a computer system 29 (shown in FIG. 4). After the optical fiber 24 is wound around the winding drum 14, any overlapping of the optical fibers 24 can be adjusted manually. Alternatively, the winding of the optical fiber 24 itself can be controlled manually or in accordance with any other technique known for wrapping wire around a spool.

Strips of a suitable reflective backing 15, such as mylar or the like, are placed at spaced intervals, indicated at 13, around the winding drum 14. The strips of reflective backing 15 can be of any suitable width desired by those skilled in the art. The winding drum 14 has a plurality of upright pegs or other such protruding means, indicated at 16, disposed at evenly spaced locations about its peripheral ends 18. The pegs 16 project along an axis perpendicular to the axis along which the optical fibers 24 extend. The strips of reflective backing 15 have registration holes 20 (best shown in FIG. 2) formed at their ends 21. The registration holes 20 are punched preferably at the time of manufacturing or before the strips of reflective backing 15 are placed around the drum 14. The strips of reflective backing 15 are held firmly in position by securing the registration holes 20 over the pegs 16.

Referring to FIG. 3, the reflective backing 15 is adhered onto the layer of optical fibers 24 by a layer of adhesive 22 applied on a surface of the reflective backing facing the optical fibers 24. The adhesive 22 is preferably a suitable conventional adhesive. The reflective backing 15 can also optionally have a layer of adhesive 23 on its back surface to facilitate mounting the backlighting panel 10 to a surface, such as a circuit board. A release paper 23a placed over the layer of adhesive 23 to the reflective backing 15 advantageously protects the adhesive 23. Thus, prior to mounting the backlighting panel 10 onto a surface, the release paper 23a is simply peeled away.

Each of the strips of reflective backing 15 is subsequently removed from its respective pegs 16, by severing the layer of optical fibers 24 in the spaces 13 extending between two strips of reflective backing 15. For example, the layer of optical fibers 24 can be severed along the broken line A—A. The reflective backing 15 now has free ends 27 of the layer of optical fibers 24 extending therefrom. Alternatively, the layer of optical fibers 24 can be cut at one end and the entire arrangement removed from the winding drum 14 before each of the strips of reflective backing are individually separated. The strips of reflective backing 15 can be cut vertically or horizontally as desired to create panels of any size.

Figure 4:
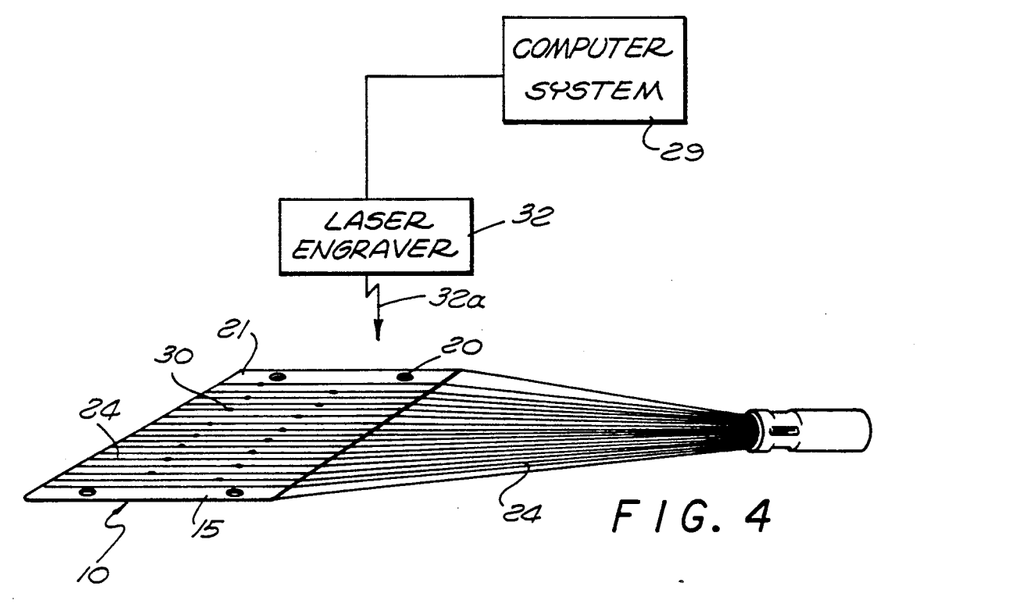
FIG. 4 is a schematic representation of the backlighting panel, a laser engraver and a computer system, showing the manner in which the laser engraver forms holes according to a predetermined geometric pattern of dot locations to provide increased and uniform illumination.
Figure 5:
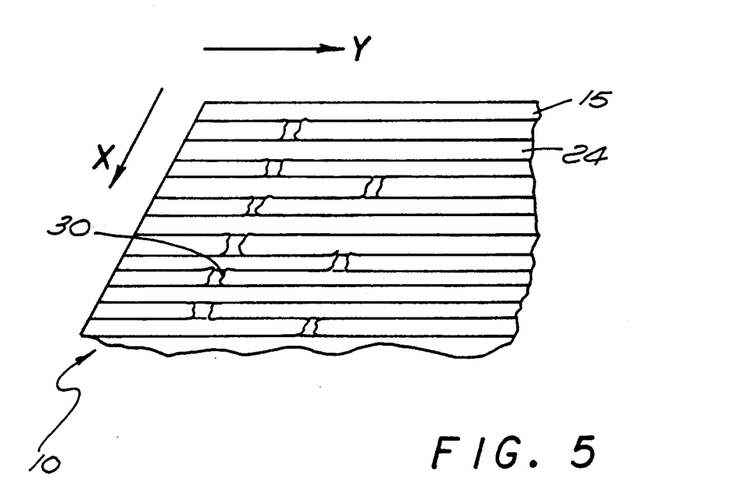
FIG. 5 is an exploded view of a portion of the backlighting panel, shown in FIG. 4, showing the holes formed by the laser engraver.

Referring now to FIG. 4, the layer of optical fibers 24 are selectively terminated at a plurality of different locations on the upper surface of the reflective backing 15 (more clearly shown in FIG. 5). A plurality of holes or apertures 30 are formed by a laser engraver 32 which can be of any conventional type, such as a carbon dioxide laser (power of 20 watts), used for engraving wood or plastic. The laser engraver 32 forms the holes 30 by directing a laser beam, indicated at 32a, over the layer of optical fibers 24. In order to ensure that the holes 30 are accurately positioned, the registration holes 20 are suitably anchored such that they keep the strip of reflective backing 15 firmly in position and prevent it from being misaligned.

The laser beam 32a is directed by a CAD (computer aided design) program. The CAD program causes the laser beam 32a to form holes 30 according to a predetermined geometric pattern of dot locations. The predetermined geometric pattern of dot locations at which the holes 30 are desired is defined or mapped and subsequently stored in a computer memory (shown as part of the computer 29). The CAD program is executed by the computer 29, of any conventional type, which controls the laser engraver 32a. The predetermined geometric pattern defines the dot locations and the laser engraver 32 forms the holes 30 at corresponding locations on the reflective backing 15.

As shown in FIG. 4, the holes 30 are formed along parallel axes which extend along the width of the backlighting panel 10. As shown in FIG. 5, the holes 30 are slightly conical in configuration. The diameter of the laser beam 32a is preferably a fraction less than the diameter of the optical fiber 24. For example, if the diameter of the optical fiber 24 is 10 mils, the diameter of the laser beam 32a is preferable 9 mils. The laser beam 32a penetrates a top portion of the optical fiber 24 and travels through to a bottom. The diameter of the hole 30 at the bottom is less than the diameter of the hole 30 at the top portion. The diameter at the top is greater as a result of melting at the top portion as the laser beam 32a penetrates through to the bottom. For example, the diameter at the top is 9 mils and the diameter at the bottom is 10 mils. This melting accounts for the laser hole 30, if aligned in the center, to cut entirely through the optical fiber 24, even though the laser beam 32a has a diameter less than the diameter of the optical fiber 24.

The holes 30 enable light passing through each of the optical fibers 24 to exit and focus substantially all its intensity at a point on the surface directly above. Forming the holes 30 in accordance with the predetermined geometric pattern ensures that no single optical fiber 24 is pierced by the laser beam 32a more than once and that maximum uniformity is achieved. Of course, in some instances the holes 30 may well be misaligned due to inaccuracies in the process. The hole locations 30 can be concentrated in specific areas, for example, below nomenclature or keypad positions (shown in FIG. 7), or alternatively can be evenly distributed throughout the backlighting panel 10 (shown in FIG. 6).

Figure 6:
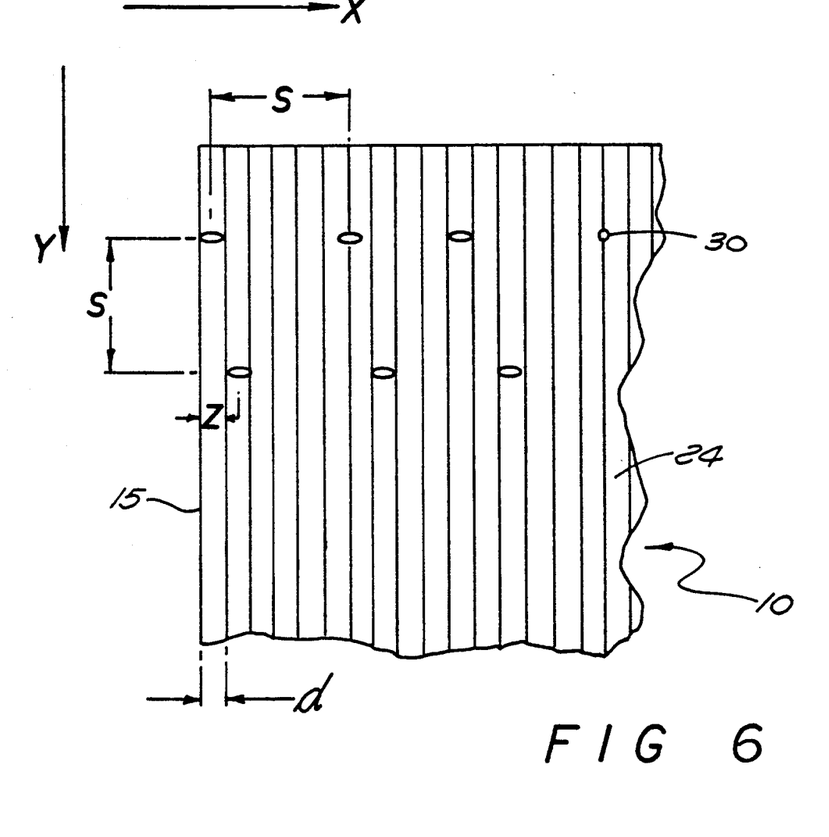
FIG. 6 is a schematic representation of a cut away portion of the backlighting panel showing an exemplary geometric pattern of dot locations.

Referring now to FIG. 6, if uniform distribution is desired throughout the device, the following algorithm can be used to determine the spacing between the dot locations:

$$S = \sqrt{(d*A)/x}$$

where:
S = spacing between the dots in the X and Y directions
X = dimension of the panel in the X direction
d = fiber diameter
A = panel surface area This algorithm in conjunction diameter of the laser beam 32a ensures that no single optical fiber 24 is cut more than once. To make sure that no single optical fiber 24 is nicked more than once, the holes 30 of any particular row are spaced by a width z of one fiber and a half to the right of holes 30 in the previous row. Thus, z equals 1.5×d (fiber diameter).

As shown in FIG. 6, the laser beam 32a forms holes 30 in each of the optical fibers 24, at evenly spaced locations throughout the plane of the backlighting panel 10, terminating the optical fibers 20 at those locations in order to ensure a uniform distribution of light for all the regions of the device. Of course, depending upon the dot locations, it is not necessary that each and every optical fiber 24 in the layer has a hole 30 formed therein.

Figure 6A:
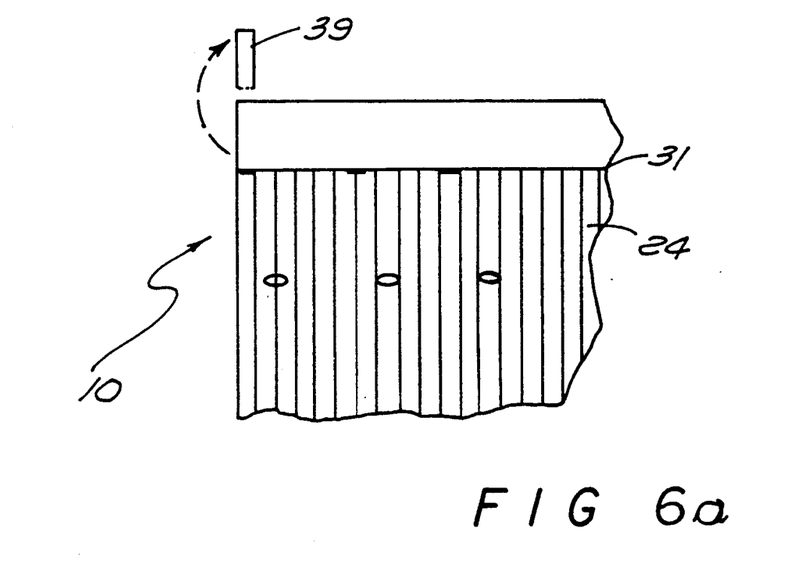
FIG. 6a is a schematic representation of a cut away portion of the backlighting panel, showing the manner in which the ends of the optical fibers are completely severed to ensure complete termination of light.

As shown in FIG. 6a, in accordance with one embodiment, in order to prevent light from travelling to ends 39 of the optical fibers 24, the light can be terminated at the last rows of dot locations by severing the ends with the laser beam 32a, indicated at 31. Alternatively, forming holes that are about 20 mils in diameter will prevent any leakage of light to the ends 39 of the optical fibers 24.

Referring again to FIG. 3, once all the holes 30 have been formed, a sheet of clear plastic 25, preferably clear Mylar ®, is laminated over the layer of optical fibers 24.

Referring now to FIGS. 7 and 8, the backlighting panel 10 is connected to a light source 38, of any conventional type, for emitting light through a ferrule 40, known in the art, to be attached to the light source 38. Light is beamed through the layer of optical fibers 24, comprising a plurality of individual optical fibers, to a plurality of different locations in a desired area for which background illumination is desired.

The reflective backing 15 with the optical fibers 24 is attached to a base 42 of the keyboard 11. The backing 15 is preferably configured in shape and area to conform to the device for which backlighting is desired. In this embodiment, the backing 15 is configured to conform to a peripheral edge 44 of the keyboard 11. The reflective backing 15 is preferably rectangular in shape and has substantially identical dimensions as the keyboard 11.

The keyboard 11 typically comprises a plurality of keypads 46 aligned in rows, as best shown in FIG. 8. The keypads 46 are aligned along ROW 1, ROW 2, ROW 3 and ROW 4. In a preferred embodiment, each of the plurality of keypads 46 is illuminated by a plurality of holes 30 formed in the optical fibers 24 only below those keypads. A single hole 30 is formed in each individual optical fiber 24, and a plurality of optical fibers 24 according to a predetermined geometric pattern are terminated below each keypad 46. For example, the keypads 46 aligned along ROW 1, indicated at 48, are illuminated by holes 30 in the optical fibers 24, aligned along ROW 1, indicated at 50. Other optical fibers 24 are also terminated below the keypads 48 in ROW 1. In a similar fashion, the keypads 46 aligned along ROW 2, indicated at 52, are illuminated by holes in optical fibers 24, also aligned along ROW 2, indicated at 54. The holes 30 are evenly spaced in both the X and Y directions, separated by the diameter of one fiber for each row. For example, if the backlighting panel 10 is square in configuration, having a width and length of 2 inches, and the optical fibers 24 are 10 mils, the holes 30 are separated by 40 thousandths of an inch both in the X and Y directions. Thus, each of the optical fibers 24 advantageously has a hole 30 formed therein by the laser beam 32a, which terminates each respective optical fiber 24 directly below each of the respective keypads 46 in a geometric pattern.

To make sure that no single optical fiber 24 is nicked more than once, the holes 30 of any particular row are spaced by a width z (shown in FIG. 6) of one fiber and a half to the right of holes 30 in the previous row. Thus, z equals 1.5×d (fiber diameter).

In applications such as home security systems it is sometimes desirable to prevent glare and provide illumination of low intensity. In such cases, the light source 38 can be of low power and efficient output of light with respect to the amount beamed in is achieved by providing a higher density of holes 30 at the end farthest away from the light source 38. As shown in FIG. 5, the holes 30 are evenly spaced only in the Y direction and are unevenly spaced in the X direction. For example, in an exemplary backlighting panel (as shown in FIG. 7) having a width and length of 2 inches and optical fibers 10 mils in diameter, the optical fibers 24 aligned along ROWs 3 and 4 can be separated by 20 thousandths of an inch, those aligned along ROW 2 can be separated by 40 thousandths of an inch and those aligned along ROW 1 can be separated by 100 thousandths of an inch.

The fiber optic backlighting panel has been primarily described herein for providing backlighting in a keypad. However, the invention may also be used to provide backlighting in membrane switches, liquid crystal displays (LCDs), rigid panels, vehicle panels and other devices which will be obvious to those skilled in the art.

Referring now to FIGS. 9 and 10, in a specific application, the backlighting panel 10 is used to provide uniformly distributed background illumination in a LCD. As shown in FIG. 9, over the reflective backing 15, the layer of optical fibers 24 and the clear plastic 25, an adhesive layer 58 is applied. A layer of foam 60, preferably polyethylene or the like, is securely disposed over the adhesive layer 58, which is again covered with another sheet of clear plastic 62, preferably Mylar ®. The sheet of plastic 62 can be wrapped around all the other layers, thereby holding them all intact.

The bubble-like formations in the foam 60 scatter the light, causing it to diffuse so as to provide uniform illumination or glow throughout the device. The foam 60 is preferably white in color and translucent. The density of the bubbles is preferably 0.35 gm/cubic inch and it is approximately 25 to 30% transmissive.

As shown in FIG. 10, two or more different layers of optical fibers 24 can also be used. Over the reflective backing 15 and layer of optical fibers 24, a layer of adhesive 63 is applied. A second layer of optical fibers 24a arranged in intimate proximity to each other, in accordance with the technique described previously, is placed over the layer of adhesive 63. A clear sheet of plastic, preferably Mylar ® is laminated over the layer of optical fibers 24a. The layer of adhesive 58 is applied over the clear plastic 25. The diffuser foam 60 is disposed over the layer of adhesive 58 and the sheet of clear plastic 62, preferably Mylar ®, is again laminated over the diffuser foam 60.

Although the invention has been described in terms of a preferred embodiment thereof, other embodiments that are apparent to those of ordinary skill in the art are also within the scope of the invention. Accordingly, the scope of the invention is intended to be defined only by reference to the appended claims.

What is claimed is:

1. A method for making a flexible fiber optic backlighting panel to provide substantially uniform and increased background illumination of a surface comprising the steps of:

providing one, flexible layer of optical fibers, said optical fibers arranged in proximity to each other; and cutting through selected optical fibers to form holes therein corresponding to a predetermined pattern of locations so that each of said optical fibers is cut only once.

2. The method of claim 1, further comprising the step of:

providing a reflective backing; and adhering said layer of optical fibers to said reflective backing.

3. The method of claim 1, further comprising the step of:

defining said predetermined pattern of locations in accordance with the equation:

$$S = \sqrt{(d^*A)/x}$$

where:

S = the spacing between the locations in the X and Y directions;
X = the dimension of the panel in the X direction;
d = the fiber diameter; and
A = the panel surface area.

4. The method of claim 1, further comprising the step of:

forming holes according to said locations at specific locations on said layer of optical fibers, each hole corresponding to a respective one of a plurality of locations on said surface to provide uniform intensity of illumination at each location.

5. The method of claim 1, further comprising the step of:

forming evenly spaced holes according to said locations evenly spaced on said layer of optical fibers, each hole corresponding to a respective one of a plurality of locations on said surface to provide uniform illumination of the surface.

6. The method of claim 5, further comprising the step of:

defining said evenly spaced locations in accordance with the equation:

$$S = \sqrt{(d^*A)/x}$$

where:

S = the spacing between the locations in the X and Y directions;
X = the dimension of the panel in the X direction;
d = the fiber diameter; and
A = the panel surface area.

7. The method of claim 5, further comprising the step of:

placing a layer of diffusing material over said layer of optical fibers to diffuse the light.

8. The method of claim 1, further comprising the step of:

winding a single optical fiber in consecutive turns to form said layer of optical fibers; and arranging said optical fibers adjacent each other without any overlapping of said optical fibers.

9. A method for making a fiber optic backlighting panel as defined in claim 1, wherein each of said optical fibers is fully cut only once.

10. The method of claim 1 further comprising positioning a plurality of layers on top of each other.

11. The method of claim 1 further comprising providing said one layer of uniform thickness.

12. The method of claim 1 further comprising:
forming one end of the layer into a bundle remote from the panel.

13. A method for providing substantially uniform and increased background illumination of a surface comprising the steps of:
providing one, flexible layer of optical fibers; and
selectively terminating various optical fibers in said layer by fully or partially cutting holes through said various optical fibers at a predetermined location on the surface corresponding to a predetermined pattern of locations.

14. A method for providing uniform and increased background illumination of a surface as defined in claim 13, additionally comprising the step of:
beaming light from a light source through said layer of optical fibers to a plurality of different locations on the surface, said holes enabling the light conducted by each optical fiber to exit therefrom and focus all the intensity of said light directly at a respective one of said plurality of locations on the surface.

15. A method for making a fiber optic backlighting panel to provide uniform and increased background illumination of a surface comprising the steps of:
providing a winding drum having a plurality of pegs disposed about peripheral ends thereof;
wrapping an optical fiber around said winding drum in consecutive turns and forming a layer of optical fibers;
positioning strips of reflective material upon said winding drum by placing registration holes formed therein over said pegs;
removing said strips of reflective material from said pegs;
cutting said layer of optical fibers between said registration holes; and
aligning each strip with said registration holes and directing a laser beam over said strip to penetrate through said optical fibers and form holes according to a predetermined geometric pattern of dot locations.

16. A method for making a fiber optic backlighting panel to provide uniform and increased background illumination of a surface as defined in claim 15, further comprising the step of:
laminating a sheet of clear plastic over said layer of optical fibers.

17. A method for making a fiber optic backlighting panel to provide uniform and increased background illumination of a surface as defined in claim 16, wherein said laminating step comprises:
laminating a sheet of Mylar ® over said layer of optical fibers.

18. An improved fiber optic panel for providing background illumination of a surface, comprising:
one, flexible layer of optical fibers for transmitting light to a plurality of different locations on the surface, said optical fibers having holes cut therethrough according to a predetermined pattern of locations, said, holes selectively terminating each optical fiber directly adjacent a respective one of said different locations and no optical fiber being cut more than once.

19. An improved fiber optic panel for providing background illumination of a surface as defined in claim 18, wherein said holes selectively terminate said optical fibers at evenly spaced locations providing uniform illumination throughout the surface.

20. An improved fiber optic panel for providing background illumination of a surface as defined in claim 19, wherein said evenly spaced locations are defined by the equation:

$$S = \sqrt{(d*A)}/x$$

where:
S = the spacing between the dots in the X and Y directions;
X = the dimension of the panel in the X direction;
d = the fiber diameter; and
A = the panel surface area.

21. An improved fiber optic panel for providing background illumination of a surface as defined in claim 18, further comprising:
means for diffusing disposed over said holes to diffuse the light to provide uniform illumination throughout the surface.

22. An improved fiber optic panel for providing background illumination of a surface as defined in claim 21, wherein said diffusing means is at least one layer of light diffusing material.

23. An improved fiber optic panel for providing background illumination of a surface as defined in claim 18, wherein said layer of optical fibers is adhered to a reflective backing.

24. An improved fiber optic panel providing background illumination of a surface as defined in claim 18, wherein no optical fiber is fully cut more than once.

25. A method for making a fiber optic backlighting panel to provide uniform and increased background illumination of a surface comprising the steps of:
providing one flexible layer of optical fibers, said optical fibers arranged in intimate proximity to each other; and
cutting through selected optical fibers to form holes therein corresponding to a predetermined pattern of locations so that each of said optical fibers has only one fully or partially cut hole.

26. An improved fiber optic panel for providing background illumination of a surface, comprising:
one, flexible layer of optical fibers for transmitting light to a plurality of different locations on the surface, said optical fibers having holes fully or partially cut therethrough according to a predetermined pattern of locations, said holes selectively terminating each optical fiber directly adjacent a respective one of said different surface locations.

27. A method of providing substantially uniform and increased background illumination comprising the steps of:
providing at least one layer of optical fibers; and
selectively terminating various of the fibers in each of said at least one layers to provide a two-dimensional pattern of illumination in each of at least one layers.

28. An improved fiber optic panel for providing background illumination of a surface, comprising:
at least one layer of optical fibers, selected fibers of each of said at least one layers being terminated in a two-dimensional pattern to provide an area of illumination in each of said at least one layers.

29. A method for making a flexible fiber optic backlighting panel to provide substantially uniform and increased background illumination of a surface comprising the steps of:

provding at least one layer of optical fibers, said optical fibers arranged in proximity to each other;

cutting through selected optical fibers with a laser beam to form holes therein corresponding to a predetermined pattern of locations so that each of said optical fibers is cut only once;

providing a reflective backing; and adhering said layer of optical fibers to said reflective backing.

30. A method for providing substantially uniform and increased background illumination of a surface comprising the steps of:

providing a layer of optical fibers; and selectively terminating various optical fibers in said layer by fully or partially cutting holes through said various optical fibers with a laser bean at a predetermined location on the surface corresponding to a predetermined pattern of locations.

31. An improved fiber optic panel for providing background illumination of a surface, comprising:

a layer of optical fibers for transmitting light to a plurality of different locations on the surface, said optical fibers having holes cut therethrough with a laser beam according to a predetermined pattern of locations, said holes selectively terminating each optical fiber directly adjacent a respective one of said different locations and no optical fiber being cut more than once.

32. A method for making a fiber optic backlighting panel to provide uniform and increased background illumination of a surface comprising the steps of:

providing at least one layer of optical fibers, said optical fibers arranged in intimate proximity to each other; and cutting through selected optical fibers with a laser beam to form holes therein corresponding to a predetermined pattern of locations so that each of said optical fibers has only one fully or partially cut hole.

33. An improved fiber optic panel for providing background illumination of a surface, comprising:

a layer of optical fibers for transmitting light to a plurality of different locations on the surface, said optical fibers having holes fully or partially cut therethrough with a laser beam according to a predetermined pattern of locations, said holes selectively terminating each optical fiber directly adjacent a respective one of said different surface locations.

34. A method for making a fiber optic backlighting panel to provide substantially uniform and increased background illumination of a surface comprising the steps of:

providing at least one layer of optical fibers, said optical fibers arranged in proximity to each other;

cutting through selected optical fibers to form holes therein corresponding to a predetermined pattern of locations so that each of said optical fibers is cut only once; and defining said predetermined pattern of locations in accordance with the equation:

$$S = \sqrt{(d*A)}/x$$

where:

S = the spacing between the locations in the X and Y directions;
X = the dimension of the panel in the X direction;
d = the fiber diameter; and
A = the panel surface area.

35. A method for making fiber optic backlighting panel to provide substantially uniform and increased background illumination of a surface comprising the steps of:

providing at lest one layer of optical fibers, said optical fibers arranged in proximity to each other;

cutting through selected optical fibers to form holes therein corresponding to a predetermined pattern of locations so that each of said optical fibers is cut only once;

forming evenly spaced holes according to said locations evenly spaced on said layer of optical fibers, each hole corresponding to a respective one of a plurality of locations on said surface to provide uniform illumination of the surface; and defining said evenly spaced locations in accordance with the equation:

$$S = \sqrt{(d*A)}/x$$

where:

S = the spacing between the locations in the X and Y directions;
X = the dimension of the panel in the X direction;
d = the fiber diameter; and
A = the panel surface area.

36. A method for making a fiber optic backlighting panel to provide substantially uniform and increased background illumination of a surface comprising the steps of:

providing at least one layer of optical fibers, said optical fibers arranged in proximity to each other;

cutting through selected optical fibers to form holes therein corresponding to a predetermined pattern of locations so that each of said optical fibers is cut only once;

winding a single optical fiber in consecutive turns to form said layer of optical fibers; and arranging said optical fibers adjacent each other without any overlapping of said optical fibers.

37. An improved fiber optic panel for providing background illumination of a surface, comprising:

a layer of optical fibers for transmitting light to a plurality of different locations on the surface, said optical fibers having holes cut therethrough according to a predetermined pattern of locations, said holes selectively terminating each optical fiber directly adjacent a respective one of said different locations and no optical fiber being cut more than once wherein said holes selectively terminate said optical fibers at evenly spaced locations providing uniform illumination throughout the surface; and wherein said evenly spaced locations are defined by the equation:

$$S = \sqrt{(d*A)}/x$$

where:

S = the spacing between the locations in the X and Y directions;
X = the dimension of the panel in the X direction;
d = the fiber diameter; and
A = the panel surface area.

* * * * *

UNITED STATES PATENT AND TRADEMARK OFFICE
CERTIFICATE OF CORRECTION

PATENT NO. : 5,226,105
DATED : July 6, 1993
INVENTOR(S) : J. Michael Myers

It is certified that error appears in the above-identified patent and that said Letters Patent is hereby corrected as shown below:

Column 3, line 23, delete "/".

Column 5, line 64, after "conjunction" insert --with the--.

Column 9, line 63, delete "said," and insert --said-- therefor.

Column 11, line 18, delete "bean" and insert --beam-- therefor.

Signed and Sealed this

Fifteenth Day of March, 1994

Attest:

BRUCE LEHMAN

Attesting Officer     Commissioner of Patents and Trademarks